UNITED STATES PATENT OFFICE.

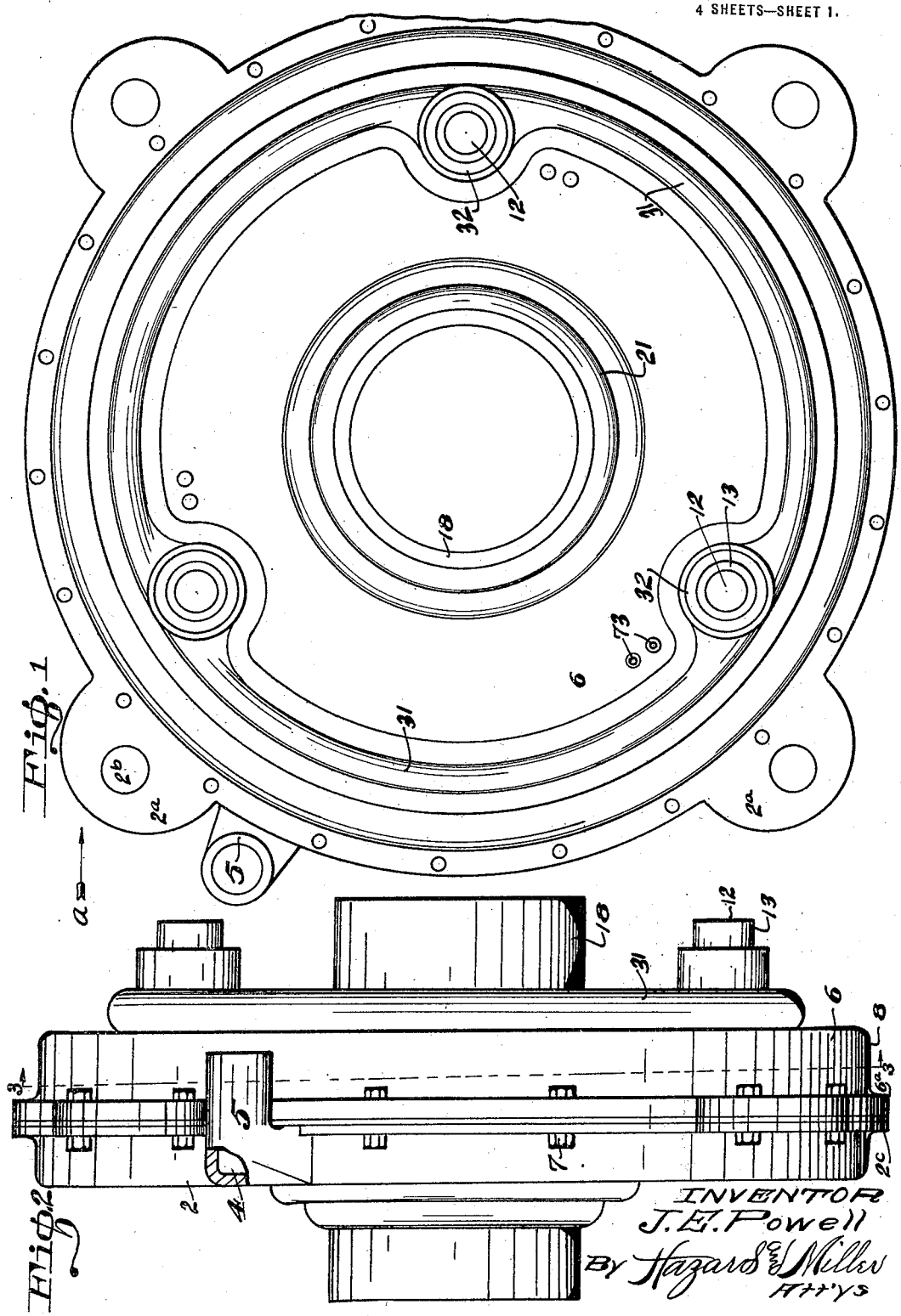

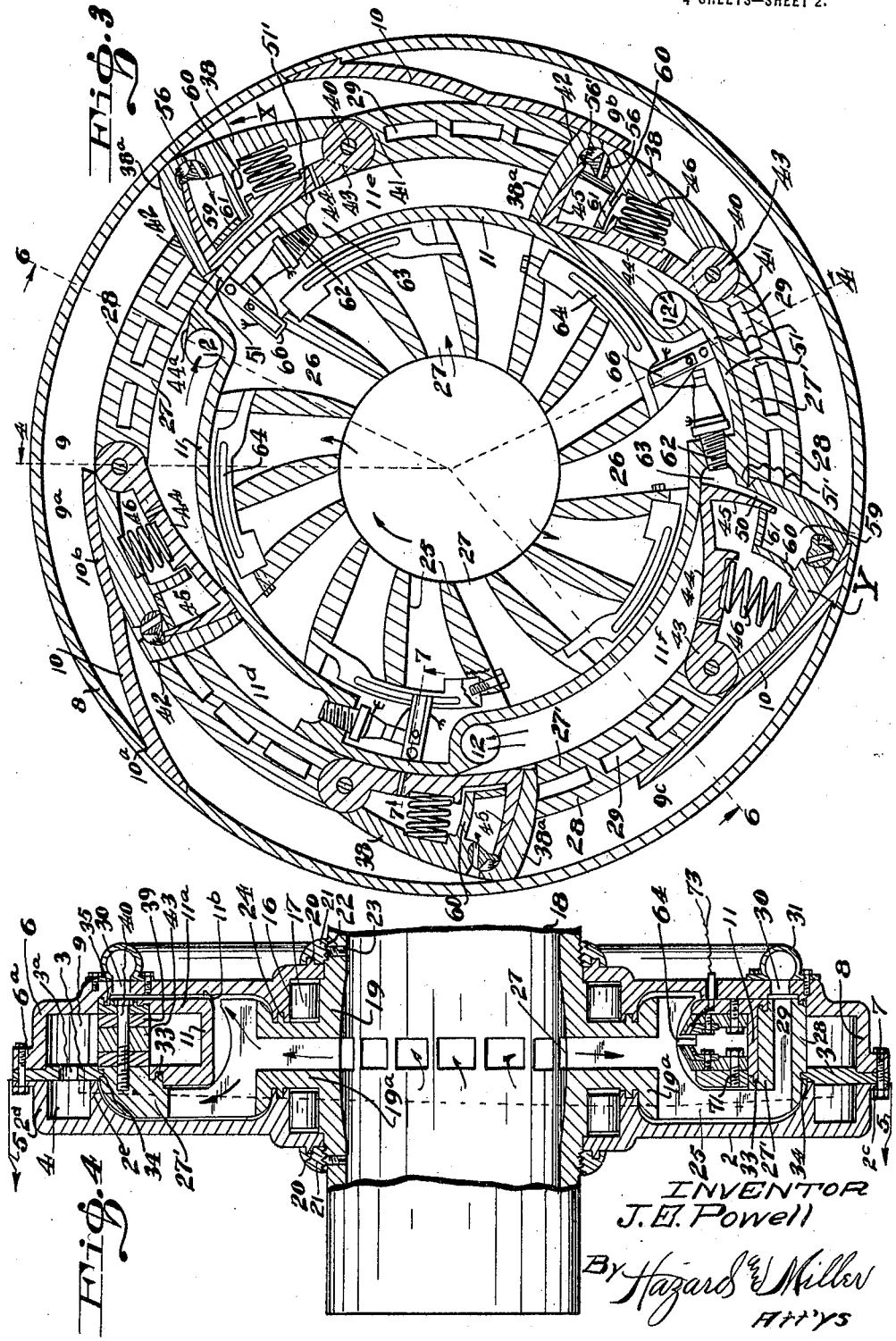

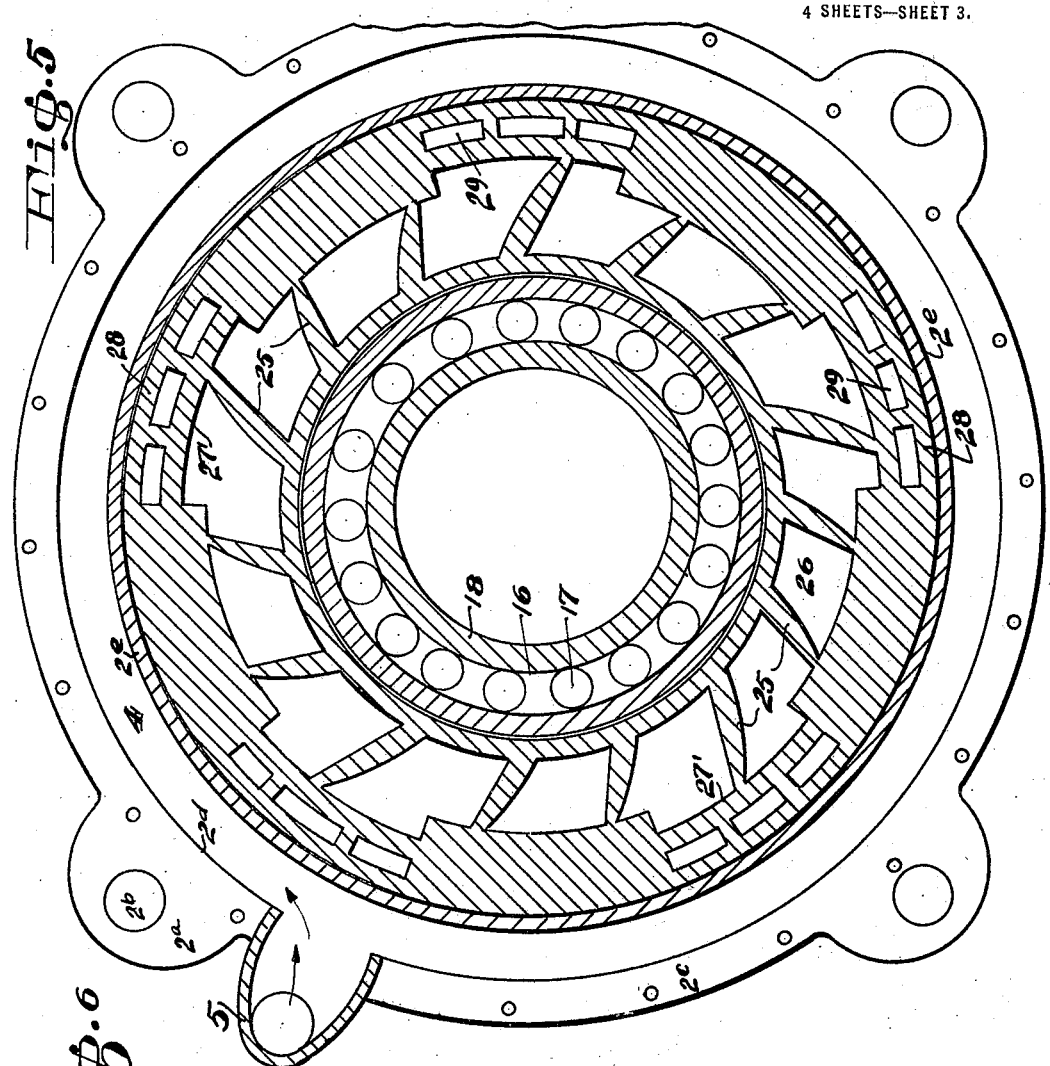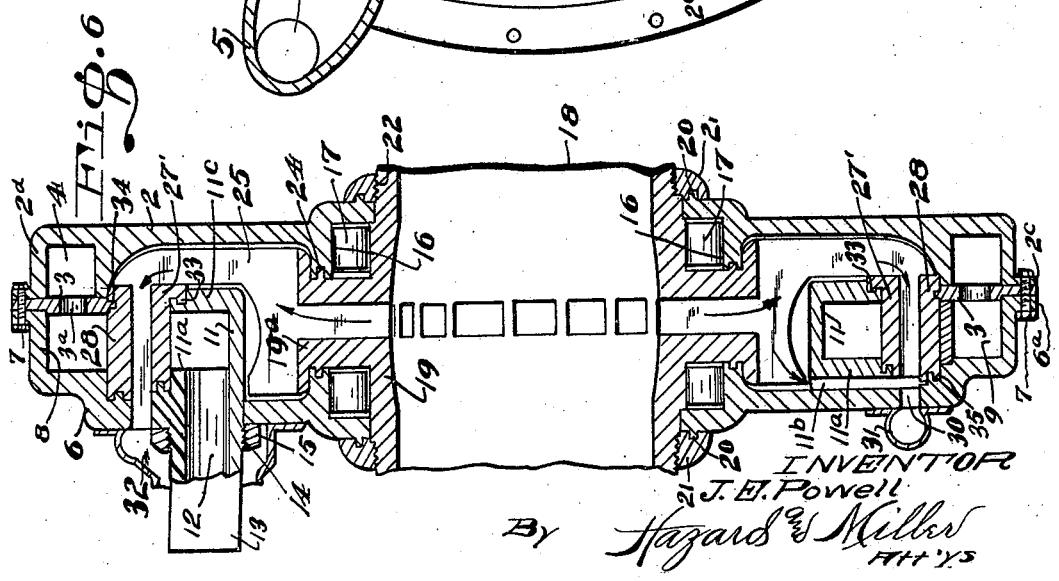

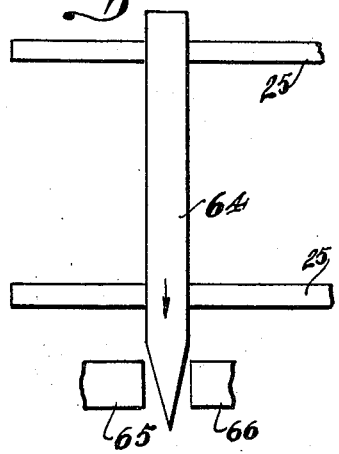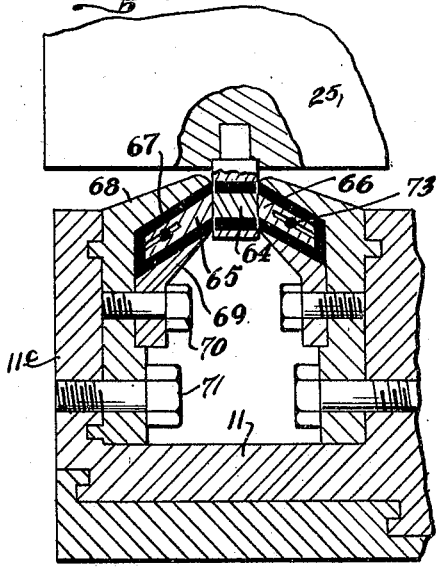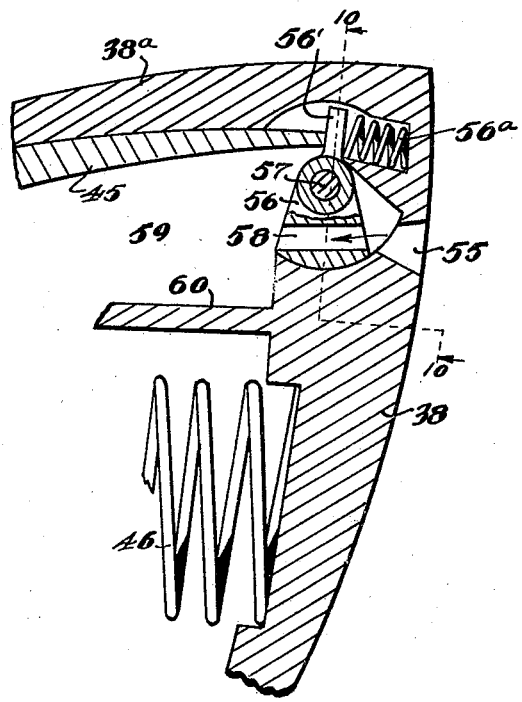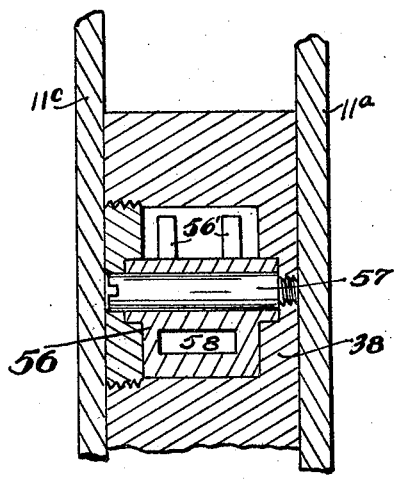

JESSE EDWARD POWELL, OF LOS ANGELES, CALIFORNIA.

ROTARY ENGINE.

1,405,326.	Specification of Letters Patent.	Patented Jan. 31, 1922.

Application filed March 30, 1920. Serial No. 369,857.

*To all whom it may concern:*

Be it known that I, JESSE EDWARD POWELL, a citizen of the United States, residing at Los Angeles, in the county of Los Angeles and State of California, have invented new and useful Improvements in Rotary Engines, of which the following is a specification.

This invention relates to internal combustion engines and particularly to internal combustion engines of the rotary principle, that is in which power is derived from the expansive force of heated gases, the force being applied directly to a casing and rotary member.

An object of the present invention is to provide an engine in which the power acts on lines at right angles to radii of the center of rotation of the rotating element of the engine, and has further for an object to provide an engine in which the force is applied with maximum leverage on the rotating piston or wheel. A further object is to provide an engine that is extremely compact in the arrangements of its parts so that for the amount of power produced the engine will occupy but minimum space being of least practical dimensions for a given horsepower engine both as to the height or length of the engine and its thickness or width.

Another object of the invention is to provide a casing of sectional construction the parts of which are constructed and arranged and formed of disc-like shape so as to provide a substantially annular interior chamber, and a further object is to provide a simple rotor or wheel member arranged within the annular chamber formed by the casing and to provide such a rotor with means co-operative with the casing structure and elements thereof so as to produce simultaneously on opposite sides of the axis of rotation power impulses. A further object is to provide a plurality of means for obtaining a plurality of impulses at each revolution, or, in other words a further object of the invention is to provide a piston member or rotor having a plurality of piston heads each of which receives a number of impulse strokes during each revolution so that the maximum efficiency of impulse operation can be imparted to a rotor within a given dimension of engine.

Another object of the invention is to provide in a rotary engine relatively rotatable casing and piston means and to provide means for producing in the chamber of the casing a plurality of expansion chambers all of the abutment forming means relative to the chambers and pistons being wholly incased within the shell of the casing.

It is further an object of the invention to provide a rotary internal combustion engine with a rotor having a plurality of piston forming members co-operative with relatively stationary means whereby the piston forming members are actuated in proper sequence during a cycle of the rotor; first for the intake of a charge of fuel; second for the compression of the charge of fuel and third so as to secure the maximum force derived from the heating of the fuel gases.

Another object is to provide a rotary engine with a rotor having means for first drawing in a charge of gas; then compressing the charge of gas in a compression compartment and then re-compressing the gas in a clutch compartment in which it is exploded while at maximum pressure of compression.

A further object of the invention is to provide means for reducing the friction of operation of the parts and so arranging the parts relatively as to eliminate sliding contact by keeping as far as possible the pressures desired in the compression of the fuel so as to prevent waste, and further to provide for the immediate exhaust of the gases when effective pressures thereof have been so diminished as to cease to have rotative effect on the driven member and also to secure the effective scavenging of the exhaust chambers of the engine.

Again the invention has for an object to provide for the effectual cooling of the interior parts of the same by the circulation of air induced naturally by the operation of the parts so as to eliminate forced draft means and also to eliminate the use of water cooling means and the usual appurtenances therefor, and a special object is to provide means for applying cooling air directly to the face of the piston head or heads of the rotor. Further to provide a timing system for causing the explosion of the fuel and to provide such a system that is wholly inclosed within the engine structure and also to provide an engine of this kind that is extremely economical to the proportion of the power developed.

Other objects and advantages will appear from the following specification relative to the invention which consists of the construction, the combination and in details and arrangements of the parts, an embodiment of which invention is illustrated in the accompanying drawings and described and claimed herein.

Figure 1 is a plan or side elevation of the improved engine.

Fig. 2 is an end view partly in section of the engine looking in the direction of the arrow $a$ on Fig. 1.

Fig. 3 is a transverse section on a plane at right angles to the axis of the engine on a line 3—3 of Fig. 2 looking in the direction of the arrow.

Fig. 4 is a section on line 4—4 of Fig. 3 looking in the direction of the arrow.

Fig. 5 is a sectional view on line 5—5 of Fig. 4.

Fig. 6 is a sectional view on line 6—6 of Fig. 3.

Fig. 7 is a transverse, sectional detail through the timer mechanism of one of the combustion chambers the section taken about on the line 7—7 of Fig. 3.

Fig. 8 is a diagrammatic plan view of the timer blade about to enter the contact plates.

Fig. 9 is a detail sectional view on a larger scale of the co-operative scavenger and piston members and the cut-off valve carried thereby.

Fig. 10 is a sectional view on line 10—10 of Fig. 9.

The engine, preferably, comprises a substantially disc-shaped casing having a back member 2 of disc-shape that may be considered the base of the engine as far as a supporting element may be concerned, and this may be provided with ears or lugs $2^a$ apertured at $2^b$ to receive fastening screws or bolts by which it may be connected to a foundation or other structure in connection with which the engine may be utilized. This base member is provided with a marginal flange $2^c$ against which is laid a flat annulus 3 having transverse passageways $3^a$. The annulus $3^a$ forms a covering for an annular chamber 4 formed between the outer flange $2^d$ and an inner flange or web $2^e$.

The annular chamber 4 is provided with means as a flue 5 to which may be attached a means for supplying fuel to the chamber 4. On the opposite side of the flat annulus 3 there is secured the outer or face casing disc or cover 6 having a flange $6^a$ overlapping the annulus 3, these parts being secured by bolts or screws 7. The casing 6 has an angular flange 8 forming with the front body portion and the annulus 3 a substantially annular chamber 9 into which fuel is supplied from the chamber 4 through the passageways $3^a$.

The chamber 9 is divided into compartments designated $9^a$ by oblique walls 10 a suitable number of which are arranged at equi-distant spaces about the chamber 9 and these partitions may consist of inserts dovetailed or interlocked in the inner surface of the flange 8 as at $10^a$, and the oblique plate portions may be extended as at $10^b$ to form short segments concentric with the axis or center of the engine.

The disc or casing member 6 has provided on its inner face, in this case, a detachable trough-shaped annulus 11 shown in Fig. 6 as having in its upright side wall $11^a$ a series of outlet or exhaust openings 12 that may be extended in the form of a tube 13 passing through the outer face plate or disc 6. The exterior of the tube 13 may be threaded as at 14 to receive a nut 15 which when turned on the threads will securely draw the annulus 11 into engagement with the surface of the disc or plate 6.

The vertical side outer face of the wall $11^a$ may be ribbed or corrugated as at $11^b$ as may also be the opposite wall $11^c$, as will be shown later for the purposes of cooling the annulus 11 which forms, essentially, a plurality of explosion or combustion chambers which are designated in Fig. 3 at $11^d$, $11^e$ and $11^f$.

The side plates 2 and 6 are provided with central hub-like portions internally grooved or rebated to form annular races 16 in which may operate antifriction rollers 17 which in turn are engaged by the race surfaces formed therefor on a hollow shaft 18. This hollow shaft has a central hub portion 19 flanked on either side by the central overlapping hub portions of the casing members 2 and 6, the latter being shown as provided with annular beads 20 mating with rings 21 threaded at 22 on to the adjacent exterior portion of the hollow shaft 18. These rings serve to hold the casing sections steady and may be secured in place by set screws 23 passed outwardly from the interior of the shaft and engaging the inner surface of the said rings 21.

The hollow shaft has its hub portion annularly extended as at $19^a$ between the adjacent sets of roller bearings 17 and just beyond these the faces of the hub are provided with packing rings or beads 24 entering recesses provided therefor in the inner surfaces of the hub members of the casing sections. These casing sections are shown as flaring beyond the packing means 24 and the hub $19^a$ is similarly flared but has a running fit thereat this widening of the hub being extended to a suitable diameter forming substantially a wheel structure having a series of spokes 25, Figs. 3 and 5, between which are formed ample air spaces 26 into which air can readily pass through openings 27 communicating therewith, these being formed to lead into the interior of the hollow shaft so that air can readily pass into the shaft and be thrown outwardly by centrifugal action so as to cool the parts. This centrifugal feed of the air is accomplished by arranging the blades 25 slightly oblique to radii of the wheel structure. The spokes 25 are peripherally connected on one side as seen in Fig. 4 by a rim or body portion 27' which is shown in Fig. 6 as formed into an overhanging flange 28 bridging and forming a cover for the mouth of the trough-shape annulus or combustion chamber forming ring 11.

Thus it will be seen that the blades are cut away beneath the annulus or ring 11 to clear the same and extend upwardly and outwardly along one side thereof and are connected by the body or rim 27 which forms a portion of the overhanging flange portion 28. This latter portion is provided with a number of transverse passageways 29 through which air may flow across, to and pass through apertures 30 provided in the casing member 6; these apertures being arranged in an annular series and directing the air into an annular tube or passageway 31 provided on the outer face of the member 6. This circular air passageway 31 has an outlet 32, Fig. 6, arranged around the exhaust pipe 13.

For the purpose of preventing loss of pressure the rim structure 27'—28 of the wheel may be provided with a packing bead 33 mating a complementary recess therefor provided in the adjacent wall 11$^c$ of the trough ring 11, and the flat wall or annulus 3 may also be provided with packing means 34 co-operative with the wheel rim 27, and the opposite casing member 6 may be provided with packing means 35 engaging or forming a good running joint with the adjacent surface of the rim portion 28.

For the purpose of utilizing the expansive force derived from the explosion or combustion of a combustible fuel that may be admitted into the annular fuel compartments 9$^a$, 9$^b$ and 9$^c$ and which is consequently compressed in the explosion chambers 11$^d$, 11$^e$ and 11$^f$, there is in this embodiment of the engine arranged on and in the rim 28 of the wheel a series of abutment or piston members each consisting of a piston 38 having hub ears 39 mounted pivotally on a pivot pin or fulcrum 40 arranged in the rim portion 27'—28 of the wheel, this piston being of arcuate form and having its outer surface struck on a curve concentric to the axis of rotation of the wheel or rotor, each of the pistons 38 being mounted in a respective pocket formed therefor in the rim portion 28, one end of each pocket having an end wall 41 concentric to the axis of the pivot 40 and the opposite end of the pocket having walls 42 also curved concentric to the pivot 40 so that in the pocket provided therefor the piston 38 can swing inwardly from a position in the pocket 9$^a$ to the position in the explosion chamber 11$^e$ in which position an end or head portion 38$^a$ of a piston forms the end wall of a chamber formed within the annulus 11 which is covered by the body 28 of the wheel.

Also concentrically mounted on a pin 40 is a hub portion 43 interposed between the hub ears 39 of the piston 38, this hub portion 43 having an inner wing-like body 44 which has its inner surface curved concentrically to the axis of rotation of the wheel. The swinging end of the member 44 is provided with an end wall 45 having an outer face curved on an axis concentric to the axis 40 on which both the members 38 and 44 are designed to oscillate and are automatically normally separated by an interposed expansion spring 46.

The piston head 38 has an inner or rear face complementary to the curved adjacent face of the end wall 45 so that when these two faces are in contact a substantially tight joint is produced, but when the related members 38—40, on a common pivot 40, are separated, as in the position at the combustion chamber 11$^f$, then a passageway 50 is produced between the piston head 38 and the inner wall 45 for the flow of fuel into the combustion chambers 11$^d$, 11$^e$ and 11$^f$ each of which is successively passed through by each of the piston members 38, in this case, of which there are five mounted on the piston wheel so that in the operation of the engine there may be produced fifteen impulses during one revolution since there are three combustion chambers and five pistons.

During the rotation of the rotor or wheel as one of the pistons 38 passes, for instance, into proximity with the space 9$^a$, Fig. 3, the piston will be released from a contracted position beneath the overhanging shoulder or flange 10$^b$ and the spring 46 will cause the piston 38 to spring outwardly to the position shown at X, Fig. 3, and as the inner wing member 44 moves along the chamber 11$^d$, for instance, this wing member 44 will ride on to an outwardly projecting shoulder 44$^a$, in this case, located in juxtaposition to an exhaust port 12 of which there is a series provided one for each of the explosion chambers 11$^d$, 11$^e$ and 11$^f$. Therefore as the yielding member 44 engages the shoulder 44$^a$, for instance, adjacent the pocket 9$^a$ then the member will be elevated or thrown outwardly and will ride on the adjacent concentric extension 51' of which there is a series formed in the ring-like trough member 11. These extensions are hollow and substantially overhang the spoke arms 25 and are thus in communication with the air passageways 27 so that the air can be utilized to cool the extended chamber forming portions 51.

When the co-ordinate members 38 and 44 are thus positioned in the outer pocket as 9ᵃ the rotation of the outwardly thrust piston 38 forms a suction in the chamber and induces a charge of fuel by the tendency for the creation of a vacuum on the trailing face of the head 38ᵃ, while at the same time on the leading and curved outermost face there is formed a compression of fuel in the space formed between the said outermost face of the piston 38 and the walls formed partly of the partitions 10.

The gaseous fuel as thus compressed between an advancing piston 38 and an adjacent partition 10 is designed to be admitted into a space or chamber formed between the co-ordinate members 38 and 44, this transfer of the compressed fuel being secured in the following manner:

As clearly shown in Fig. 9, the piston member 38 has adjacent its swinging end a port 55 leading into a valve chamber in which there is arranged an oscillating valve 56 having a fulcrum or pivot 57 that is supported in the piston member 38, this valve consisting of a segment of a cylinder having for its center the axis of the pivot pin 57.

Extending from side to side of this segmental valve 56 is a port or passageway 58 which, in the position of the parts shown at X in Fig. 3 and in Fig. 9, permits the passage of the compressed fuel from the port 55 through the port 58 and into a space 59 which is formed behind the wall 45 of the member 44 and a wall 60 extending inwardly from the piston 38, and the inner surface of the wall 45 is curved concentric to the pivot pin 40 of the co-ordinate members 38—44 and a closure for the bottom of the chamber 59 is formed by a web or bottom part 61 which is carried by the rim portion 28 of the wheel or rotor.

As a given piston member 38 with its inner wing 44 passes from the position X, Fig. 3, downwardly the piston will be moved inwardly as it encounters the cam forming wall 10 at the right-hand of Fig. 3, and as it swings in the inner wing 44 rides off of the overhanging shoulder 51′ of the extension 51. The position of the parts is represented at Y in Fig. 3 and it will be seen that the separated members 38 and 44 form the passageway 50 so that compressed fuel from the chamber 59 will be forced through the passageway 50 and may then be ignited by the completion of a sparking circuit including a spark plug 62 of which there is one for each of the extension chambers 51, the spark plug being located in the overhanging shoulder 51′ of its extension, and this extension is preferably formed with a concavity 63 in which the end of the spark plug is exposed and thus protected from contact and injury by the oscillating members 44.

The movement of the valve 56 of the oscillated piston members 38—44 is secured by the engagement of the wall 45 with arms 56′ extended from the hub of the valve and which arms are engaged by a spring or springs 56ᵃ arranged in the valve chamber in which the valve 56 swings. The valve, therefore, is opened when the members 38—44 are in the position shown at X, Fig. 3; but as these members separate the valve port 58 is turned out of register with the port 55 and therefore prevents passage of the fuel.

It will be seen then in the operation of the engine that the explosive force of the ignited gases in the combustion chambers formed by the wall surface of the extension 51′ and the face 38ᵃ of a piston results in the driving of the rotor wheel with the several piston members, and it will be seen that there will be as many impulses on each piston member in one rotation as there are explosion chambers in the engine.

As the piston members move along in the innermost or impulse stroke the inwardly pressed members 44 form scavengers for forcing the gas of previous explosions from each of the explosion chambers, the gas being expelled from the opposite end of the explosion chambers by passing out of the exhaust ports 12.

Any suitable means for igniting the fuel charges may be utilized, but a preferred form consists of a set of contact runners shown in detail in Figs. 7 and 8, these runners consisting of arcuate bars 64 of suitable length that are secured on and insulated from the outer portions of suitable blades or spokes 25 of the rotor, and each timer bar or shoe 64 is so positioned as to pass successively between a series of spaced contact members 65 and 66 that are mounted on and insulated from the wall structure of the extensions 51.

The simple form of mounting the contact members 65—66 is shown in Fig. 7 in which the contacts are arranged on pieces of insulation 67 that are clamped between members 68 and 69, the latter being screwed as at 70 to the member 68 and this member is screwed as at 71 to the adjacent wall as 11ᶜ of the combustion chamber forming ring 11.

Feed wires to supply current may be connected to the spark plug by suitable terminals indicated at 73, Fig. 1, one of the terminals having a connection to one of the contact members 65 whilst the other is electrically connected to the co-ordinate contact member 66, and then as the contact shoe or timing member of each piston of the rotor passes in juxtaposition to or engages the contacts 65—66 a circuit will be completed to the respective spark plug 62 and the return of the circuit will be completed through the spark gap terminals of the spark plug and thence preferably out on a lead connected to the other of the terminals 73.

By reference to Fig. 3 it will be observed that the expansion chambers and the expandible pistons are so arranged relative to one another that when an explosion occurs in one of the combustion chambers, an explosion will occur in the next combustion chamber to be fired before the driving force of the expanding gases in the first combustion chamber have been completely expended. As a result it will be noted that a continuous driving impulse is imparted to the engine. It will also be observed that successive explosions in the combustion chambers occur first at one side of the engine and then at a point at the opposite side of the axis of the engine. This arrangement of successive power strokes in combination with the arrangement whereby a continuous impulse is provided, will produce a well balanced and quietly running engine structure.

Various changes may be made without departing from the spirit of the invention as claimed.

What is claimed is:

1. A rotary internal combustion engine comprising a casing, an annular partition in said casing forming an annular chamber in said casing beyond said partition, said partition having an annular trough in the outer side thereof, radial abutment means in said trough, radial abutment means in the annular chamber, a rotor in the casing, expandible piston means carried by said rotor and running in said trough and in said annular chamber so as to form a combustion chamber in said trough between the expandible piston means and the radial abutment means in said trough, and a compression chamber in said annular chamber between the expandible piston means and the radial abutment means in said annular chamber.

2. A rotary internal combustion engine comprising a sectional casing, an annular partition in said casing forming an annular chamber in said casing beyond said partition, said partition having an annular trough in the outer side thereof, radial abutment means in said trough, radial abutment means in the annular chamber, a rotor in the casing, expandible piston means carried by said rotor and running in said trough and in said annular chamber so as to form a combustion chamber in said trough between the expandible piston means and the radial abutment means in said trough, and a compression chamber in said annular chamber between the expandible piston means and the radial abutment means in said annular chamber.

3. A rotary internal combustion engine comprising a casing, an annular partition in said casing forming an annular chamber in said casing beyond said partition, said partition having an annular trough in the outer side thereof, radial abutment means in said trough, a rotor in the casing expandible piston means carried by said rotor and running in said trough so as to form a combustion chamber in said trough between the expandible piston means and the radial abutment means, and cellular parts in said rotor extending around and beyond said trough for the introduction of a cooling medium to the interior mechanism of the engine.

4. A rotary internal combustion engine comprising a casing, an annular partition in said casing forming an annular chamber in said casing beyond said partition, said partition having an annular trough in the outer side thereof, a series of radial abutment means in said trough, a series of radial abutment means in the annular chamber, a rotor in the casing, expandible piston means carried by said rotor and running in said trough and in said annular chamber so as to form combustion chambers in said trough between the expandible piston means and the series of radial abutment means in said trough, and compression chambers in said annular chamber between the expandible piston means and the series of radial abutment means in said annular chamber.

5. A rotary internal combustion engine comprising a casing, an annular partition in said casing having an annular trough in the outer side thereof, radial abutment means in said trough, a rotor in the casing, expandible piston means carried by said rotor and running in said trough so as to form a combustion chamber in said trough between the expandible piston means and the radial abutment means, and means for positively expanding the piston means.

6. A rotary internal combustion engine comprising a casing, a hollow shaft in said casing, a rotor on said shaft, said rotor having outwardly extending air passageways communicating with the hollow shaft, blades extending from the rotor on each side of the passageways, an annular partition in said casing forming an annular trough in the outer side thereof, radial abutment means in said trough, and expandible piston means carried by said rotor and running in said trough so as to form a combustion chamber in said trough between the expandible piston means and the radial abutment means, the said passageways extending around said annular partition in order to cool the combustion chamber during operation of the engine.

7. A rotary internal combustion engine comprising a casing, a hollow shaft in said casing, a rotor on said shaft, said rotor having outwardly extending air passageways communicating with the hollow shaft, blades extending from the rotor on each side of the passageways, an annular partition in said casing forming an annular trough in the outer side thereof, radial abutment means in said trough, expandible piston means carried by said rotor and running in said trough so as to form a combustion chamber in said trough between the expandible piston means and the radial abutment means, and an extension upon said blades forming a cover for said trough, the said air passageways extending within said extension in order to cool the combustion chamber during operation of the engine.

8. A rotary internal combustion engine comprising a casing, an annular partition in said casing forming an annular chamber in said casing beyond said partition, said partition having an annular trough in the outer side thereof, radial abutment means in said trough, radial abutment means in the annular chamber, a rotor in the casing, piston means carried by said rotor and operative in the annular chamber and in said trough, said piston means comprising co-ordinate expanding oscillating piston members which when contracted have one of the same forming a reaction member in said trough and against which the expansive force of the gases is exerted, and the other forming an exhaust means in said trough operative to discharge previously formed gases while the piston member is subjected to pressure by expanding gases, the first mentioned piston member, when the piston members are expanded forming a suction means in the annular chamber in rear of said piston member and also forming a compression means in said annular chamber in advance of said piston member.

9. A rotary internal combustion engine comprising a casing, an annular partition in said casing forming an annular chamber in said casing beyond the partition, said partition having an annular trough in the outer side thereof, a rotor in said casing, a series of oscillating expanding pistons carried by said rotor and running in said trough and in said annular chamber, a series of abutment means in said trough forming a series of expansion chambers, ignition means at one end and exhaust means at the opposite end of each expansion chamber, and a series of abutment means in said annular chamber forming a series of suction and compression chambers, the respective parts of said expanding pistons operating in said expansion chambers and in said suction and compression chambers respectively.

10. A rotary internal combustion engine comprising a casing, an annular partition in said casing forming an annular chamber in said casing beyond the partition, said partition having an annular trough in the outer side thereof, a rotor in said casing, a series of oscillating expanding pistons carried by said rotor and running in said trough and in said annular chamber, a series of abutment means in said trough forming a series of expansion chambers, ignition means at one end and exhaust means at the opposite end of said expansion chamber, and cam forming walls in the annular chamber forming a series of fuel pockets.

11. A rotary internal combustion engine comprising a casing, an annular partition in said casing forming an annular chamber in said casing beyond the partition, said partition having an annular trough in the outer side thereof, a rotor in said casing, a series of oscillating expanding pistons carried by said rotor and running in said trough and in said annular chamber, a series of abutment means in said trough forming a series of expansion chambers, ignition means at one end and exhaust means at the opposite end of said expansion chamber, and cam forming walls in the annular chamber forming a series of fuel pockets, said expanding pistons forming intermediate chambers between the respective parts of the same, said pistons operative during a portion of their cycle to induce fuel into the said fuel pockets, then to transfer previously induced fuel into the intermediate compartments, then to compress the fuel in the fuel chambers, and then to discharge the same into the expansion chambers for ignition of said fuel.

12. A rotary internal combustion engine comprising a casing, an annular partition in said casing forming an annular chamber in said casing beyond the partition, said partition having an annular trough, abutment means in said annular chamber, abutment means in said trough, a rotor in said casing having pockets therein, sectional means therein co-operating with the abutment means in said annular chamber and in said trough to form compression chambers and expansion chambers respectively, the sectional means functioning to draw a charge of gaseous fuel into a compression chamber and compress a charge in a compression chamber, while expansion within an expansion chamber and against the sectional means impel the rotor and causes the sectional means to expel the burnt charge of a previous expansion from an expansion chamber.

13. A rotary internal combustion engine comprising a casing, an annular partition in said casing forming an annular chamber in said casing beyond the partition, said partition having an annular trough, abutment means in said annular chamber, abutment means in said trough, a rotor in said casing having pockets therein, sectional means therein co-operating with the abutment means in said annular chamber and in said trough to form compression chambers and expansion chambers respectively, said sectional means comprising a pair of oscillating pistons mounted on a common pivot and having means normally exerting a pressure to separate the pistons into the compression chambers and the expansion chambers.

14. A rotary internal combustion engine comprising a casing, an annular partition in said casing forming an annular chamber in said casing beyond the partition, said partition having an annular trough, abutment means in said annular chamber, abutment means in said trough, a rotor in said casing having pockets therein, sectional means therein co-operating with the abutment means in said annular chamber and in said trough to form compression chambers and expansion chambers respectively, said sectional means comprising a pair of oscillating pistons mounted on a common pivot and having means normally exerting a pressure to separate the pistons into the compression chambers and the expansion chambers, said pistons forming a fuel passage, and valvular means for the same carried by one of the pistons and operative by the other piston.

15. A rotary internal combustion engine comprising a casing, an annular partition in said casing forming an annular chamber in said casing beyond the partition, said partition having an annular trough, abutment means in said annular chamber, abutment means in said trough, a rotor in said casing having pockets therein, sectional means therein co-operating with the abutment means in said annular chamber and in said trough to form compression chambers and expansion chambers respectively, said sectional means comprising a pair of oscillating pistons mounted on a common pivot and having means normally exerting a pressure to separate the pistons into the compression chambers and the expansion chambers, said pistons forming a fuel passage, valvular means for the same carried by one of the pistons and operative by the other piston, and means for automatically closing said valvular means as the pistons separate.

16. A rotary engine including a casing, a rotor therein, piston means carried by said rotor, expansion chambers within said casing having said piston means co-operating therewith at one side of said piston means, compression chambers in said casing having said piston means co-operating therewith at the opposite side of said piston means, ignition means for said expansion chambers, said piston means drawing fuel into the compression chambers in rear of said piston means and compressing the fuel in the compression chambers in front of said piston means, said piston means also having ports for supplying the compressed fuel to the expansion chambers for explosion thereof, said piston means expelling the burnt charges from the expansion chambers in front of said piston means, the expansion chambers being of such length and so circumferentially spaced and arranged with relation to the sequence of firing of said ignition means as to cause succeeding explosions in the expansion chambers to overlap in order to produce a continuous propelling force, and to cause succeeding explosions to occur in opposite halves of the cycle of rotation of the engine.

In testimony whereof I have signed my name to this specification.

JESSE EDWARD POWELL.